United States Patent Office 3,088,865
Patented May 7, 1963

3,088,865
IMPROVING FERTILIZED AVIAN EGGS WITH
21-THIOCYANO-17a-OH-PROGESTERONE
Nathan Wernicoff, Vineland, N.J., and Gregory G. Pincus, Northboro, Mass., assignors to Vineland Poultry Laboratories, Vineland, N.J., a partnership
No Drawing. Filed Sept. 26, 1958, Ser. No. 763,459
8 Claims. (Cl. 167—53.1)

The present application is based upon our discovery that when the steroid 21-thiocyano-17a-OH-progesterone is made available to the live animal embryo of a fertilized avian egg it will stimulate the life-growing processes during incubation and increase the yield of chicks from a given batch of eggs. But even more surprising and unexpected than this is the fact that when the steroid is made available in optimum amounts it is capable of facilitating the formation of a live embryo in eggs which although naturally fertilized showed no sign of a living embryo prior to treatment. This effect of the steroid for causing live embryos to form further serves to increase the yield of chicks from a given batch of eggs.

In the poultry industry today the farmer looks to commercial hatcheries for new chicks to replenish his stock. In an average size commercial hatchery, up to one hundred thousand eggs can be incubated in a year and incubation is very carefully controlled to insure as high a yield of chicks as possible. The yield primarily depends upon the number of fertile eggs with a live embryo, and for this reason many commercial hatcheries maintain special flocks and use selective breeding to insure as large a number of hatchable eggs as possible.

During the good laying seasons of the year about 80 to 90% of the eggs contain live embryos and with such a high percent of fertile eggs the total yield of chicks is about 80 to 85%. During the poor laying seasons the number of viable embryos will drop to about 50 to 65% and with this low potential the yield of chicks drops to about 50 to 55% of the total number of eggs incubated. In well run commercial hatcheries an average yield for any one year of about 75% of the total number of eggs incubated is considered excellent.

By treating eggs in accordance with the present invention the average annual yield of chicks in the poor laying seasons in a commercial hatchery may be increased from about 75% to about 85%.

Statistically it would appear impossible for use to achieve our results. We are here dealing with biological life-growing processes and according to statistics it would appear that nature has established a plateau which as a practical matter limits the yield of chicks even when incubation is carried out under the most carefully controlled conditions. Repeated experiments have proven that such limit is not inflexible, and with eggs treated in accordance with our invention we have been able regularly to achieve yields heretofore considered virtually impossible to obtain in commercial practice.

It may well be that the steroid of our invention acts as a strong stimulant to the biological life-growing processes of the animal embryo or on the other hand it may provide an essential ingredient for life not present in a natural egg. But regardless of the exact nature of the way in which the steroid acts, the fact remains that when the hormone is made available to a live animal embryo the number of chicks that hatch out is increased and when the hormone is made available in optimum amounts to the life-giving cells of the blastoderm of the egg it so stimulates the life-growing activity that a live embryo is caused to form which before treatment failed to show under the most careful candling. This is indeed completely unexpected, since it is known that 21-thiocyano-17a-OH-progesterone is a hormone antagonist which inhibits hormone activity, and it would therefore be expected that 21-thiocyano-17a-OH-progesterone would interfere with the embryo-forming cell activity, which is controlled by appropriate hormone stimulation.

Increasing the number of live embryos is especially important during the poor laying seasons when the number of hatchable eggs is only about 60 to 65% of normal. In such case eggs treated with the synthetic steroid of our invention give a 68 to 73% yield of chicks which represents an increase of from 3 to 8% over that possible to achieve with fertile eggs provided by nature.

In all cases chicks hatched from eggs treated with 21-thiocyano-17a-OH-progesterone were viable, healthy and vigorous and tended to have greater resistance to disease than ordinary chicks hatched from untreated eggs.

21-thiocyano-17a-OH-progesterone may be used alone or it may be used in combination with one or more other ingredients such as sex hormones, vitamins, minerals, enzymes, antibiotics, etc. The particular combination employed will depend upon the situation at hand. For example, vitamins may be used in those cases where the eggs are found to be deficient in natural vitamin content, and we have found that vitamins do not interfere with the action of 21-thiocyano-17a-OH-progesterone and in some cases actually stimulate a further increase in the yield of chicks from a given batch of eggs. On the other hand, antibiotics may be used if a disease should threaten to spread through the flock. Sex hormones may be combined with 21-thiocyano-17a-OH-progesterone where it may be desirable to produce all cockerels or all hens.

Any of the known methods for causing ingredients to pass through the shell of a whole egg and into the interior may be employed in carrying out our invention. For example 21-thiocyano-17a-OH-progesterone may be injected into the egg by means of a hypodermic needle or the steroid may be applied as a fine spray to the shell of the egg so that it will thereafter be drawn through the pores of the shell and into the interior of the egg. As is known this may be done most conveniently by merely adding 21-thiocyano-17a-OH-progesterone to the humidifier of the incubator. These methods are now well known in the art and it will be understood that the method employed for causing our steroid to penetrate into the egg does not constitute any part of the present invention.

In our work we have found it convenient to dip the eggs in a liquid treating medium that contains as an essential ingredient thereof 21-thiocyano-17a-OH-progesterone. As is now known when a whole shell egg is dipped or otherwise wet with a liquid the liquid will be slowly drawn into the egg magma, and the liquid will be drawn in more quickly if the temperature of the egg exceeds that of the liquid medium. For this reason, when the egg is dipped in liquid it is customary to have the egg at a temperature from about 10 to about 40° F. above the temperature of the liquid. It is to be noted, however, that in order to avoid injury to the embryo of a fertile egg, it should not be heated to a temperature in excess of about 80° F.

The liquid treating medium for dipping the eggs may be readily made up in known manner by simply adding 21-thiocyano-17a-OH-progesterone to a non-toxic liquid carrier in which the steroid is soluble or dispersible. The solubility of 21-thiocyano-17a-OH-progesterone in organic solvents is known and the data is given in the literature so that those skilled in the art can readily select a suitable solvent. For best results, the non-toxic liquid carrier employed in the treating medium should be one that does not chemically react with the egg magma or with the 21-thiocyano-17a-OH-progesterone. If reaction does take place it should be one of known characteristics that will not harm the biological life-growing processes of the embryo. If two or more different liquid carriers are employed, they should not react chemically with each other or if they do react the reaction product should be one that will not adversely affect development and hatching of the chicks. Among the non-toxic liquid carriers which have proven useful in carrying out our invention, particularly good results have been achieved with organic alcohols, ethers and fatty oils.

Preferred organic solvents which we have employed with excellent results include ethyl alcohol and isopropyl alcohol. Polyethylene glycols such as diethylene glycol and ethers such as diethyl ether and isopropyl ether also can be used. Oils in which the 21-thiocyano-17a-OH-progesterone has been dispersed include vegetable oils such as sesame, corn, soybean or cottonseed oil.

These named liquid carriers are known, and have previously been used for carrying vitamins and other ingredients through the shell of a whole egg and into the magma thereof. Other non-toxic liquid carriers may be employed in the liquid treating medium which are known to be effective for dissolving, dispersing or emulsifying 21-thiocyano-17a-OH-progesterone. Enough 21-thiocyano-17a-OH-progesterone is introduced to give a growth-promoting effect, as evidenced by an improved yield of hatched eggs. Very small amounts are sufficient. Only a trace of 21-thiocyano-17a-OH-progesterone will be introduced from a 0.01 mg./ml. 21-thiocyano-17a-OH-progesterone solution in the brief time required to dip the eggs for 40 seconds and then store it while wet with solution at an incubation temperature. Yet, this amount will give a marked improvement in the number of eggs hatched. Nor is there any upper limit, save for the limits imposed by economics. Since optimum results are obtained with small amounts, large amounts are wasteful. The amount of 21-thiocyano-17a-OH-progesterone made available to the egg magma may be changed by changing the concentration of 21-thiocyano-17a-OH-progesterone in the liquid treating medium. From our work it would appear that a liquid treating medium containing only a trace (0.01 mg. of 21-thiocyano-17a-OH-progesterone per ml. of liquid) will provide some of the benefits of our invention and the same would apply to a liquid treating medium containing as much as 35 mgs. of 21-thiocyano-17a-OH-progesterone per ml. of liquid. In commercial practice, however, we have achieved best results by dipping the eggs in a liquid treating medium containing about 0.1 mg. to 25.0 mgs. of 21-thiocyano-17a-OH-progesterone in each ml. of liquid, and this as we now see it constitutes the range of optimum concentration. It will be understood that the specified range of concentrations applies to liquid treating mediums in which the eggs are dipped. If other methods are employed different concentrations may be used. For example, only a small amount of a very highly concentrated liquid may be sprayed on the shell or injected into the egg magma to provide an amount of 21-thiocyano-17a-OH-progesterone equivalent to that specified for dipping the eggs.

The length of time during which the eggs are held in the liquid medium at optimum concentrations does not seem to affect the results to any appreciable extent and while dipping is preferably carried out immediately prior to incubation if desired the eggs may be dipped after incubation has started as in the known dipping processes where eggs are treated by dipping in vitamins and other liquids up to eight days or more after the first day of incubation.

The following examples are given solely for the purpose of illustrating additional details of the present invention and it will be understood that our invention is not to be limited to the details set forth in the examples. In all of the examples chicken eggs were employed since raising chickens to supply eggs and meat for the table constitutes the most important branch of the poultry industry today.

In the examples set forth below the liquid treating mediums were made up by adding 21-thiocyano-17a-OH-progesterone to isopropyl alcohol and immediately prior to incubation 190 eggs were placed in an open wire tray and submerged in the liquid for about 40 seconds. Thereafter the eggs were removed from the tray and incubated in the usual manner. In each of the examples the control and treated eggs were both selected from the same lot and each egg was carefully candled to determine if it contained a live embryo. Thereafter the eggs were candled throughout the incubation period in order to determine the number of eggs that subsequently developed a live embryo caused by treating it with 21-thiocyano-17a-OH-progesterone. Each of the examples was conducted with 190 eggs and in the case of the control the eggs were not treated but were incubated along with the treated eggs.

| Example Number | Liquid Treating Medium | Percent Fertile Eggs | Percent Fertile Eggs Hatched | Percent Gain Fertile Eggs Hatched | Percent Total Eggs Hatched | Percent Gain Total Eggs Hatched |
|---|---|---|---|---|---|---|
| Control | | 90.3 | 80.7 | | 78.0 | |
| 1 | 21-thiocyano-17a-OH-progesterone, 0.2 mg./ml. | 92.4 | 86.0 | 5.3 | 85.1 | 7.1 |
| 2 | 21-thiocyano-17a-OH-progesterone, 0.2 mg./ml., plus indolebutyric acid, 0.2 mg./ml. | 94.1 | 93.1 | 12.4 | 91.0 | 13.0 |
| Control | | 86.0 | 83.7 | | 80.9 | |
| 3 | Aquasol E, 2 mg./ml. 90% isopropyl alcohol, plus 21-thiocyano-17a-OH-progesterone, 0.2 mg./ml. | 91.2 | 92.1 | 8.4 | 91.1 | 10.2 |

In the case of the control, the number of live embryos did not change but remained the same as it was at the time the embryos were first candled. As shown in the examples this was not the case with eggs treated in accordance with our invention because an embryo was caused to form in the eggs subsequent to treatment.

Example 1 shows that 21-thiocyano-17-OH-progesterone was effective for stimulating the life-giving cells of a fertile egg to cause an embryo to form, so that the percent of fertile eggs containing a live embryo exceeded that of the control by 5.3%. When this increase in the number of fertile eggs that contain a live embryo is compared to an increase of 7.1% over the control in the total number of eggs that hatched out chicks, it will also be seen that the synthetic steroid is effective for stimulating the biological life-growing processes, and that the total effect of this resulted in a significant increase in the yield of chicks.

Example 2 illustrates the use of 21-thiocyano-17a-OH-progesterone in combination with the plant hormone 3-indolebutyric acid; both together are very effective for increasing the yield of chicks.

Example 3 illustrates the use of a vitamin E in combination with 21-thiocyano-17a-OH-progesterone and as in Example 2 both together are very effective to increase the total yield of chicks.

All of the chicks were viable, healthy and vigorous. The health of the chicks hatched from treated eggs was in generally better condition than that of the chicks hatched from the untreated eggs of the control.

It will be understood that it is intended to cover all changes and modifications of the preferred form of in-

What is claimed is:

1. The method of treating fertilized avian eggs, while intact within the shell, to stimulate the biological life-growing processes during incubation which comprises the step of providing a live embryo in such fertilized avian eggs with a supply of at least 0.01 mg. of 21-thiocyano-17a-OH-progesterone.

2. The method of treating fertilized avian aggs, while intact within the shell, to increase the hatch thereof beyond the maximum hatch obtainable under conventional conditions of laying and incubation which comprises introducing into the interior of such fertilized avian eggs a liquid treating medium which includes as an essential ingredient thereof at least 0.01 mg. 21-thiocyano-17a-OH-progesterone for each ml. of liquid treating medium and then incubating the eggs.

3. The method of claim 2 which includes the step of dipping the eggs into the liquid treating medium to effect the introduction thereof.

4. The method specified in claim 2 which includes the step of maintaining the liquid treating medium at a temperature below that of the eggs at the time of introduction thereof.

5. The method of treating fertilized avian eggs, while intact within the shell, to increase the hatch thereof beyond the maximum hatch obtainable under conventional conditions of laying and incubation which comprises the steps of forming a liquid treating medium which includes as an essential ingredient thereof 21-thiocyano-17a-OH-progesterone in the proportion of about 0.01 to about 35.0 mgs. for each ml. of liquid treating medium, providing the interior of such fertilized avian eggs with a supply of such liquid treating medium and thereafter subjecting the treated eggs to incubation.

6. The method specified in claim 5 in which the liquid treating is formed with isopropyl alcohol.

7. The method specified in claim 5 in which the liquid treating medium includes a vitamin E in combination with the 21-thocyano-17a-OH-progesterone.

8. A fertilized avian egg treated in accordance with the method specified in claim 2.

References Cited in the file of this patent

UNITED STATES PATENTS

| | | |
|---|---|---|
| 1,516,012 | Hinrichs | Nov. 18, 1926 |
| 2,734,482 | Seltzer | Feb. 14, 1956 |
| 2,824,546 | Klette | Feb. 25, 1958 |
| 2,851,006 | Taylor | Sept. 9, 1958 |
| 2,945,765 | Snyder et al. | July 19, 1960 |
| 2,951,759 | De Zeeuw et al. | Sept. 6, 1960 |
| 2,965,541 | Byrnes | Dec. 20, 1960 |
| 3,009,857 | Gassner | Nov. 21, 1961 |